(12) United States Patent
Grethel

(10) Patent No.: US 8,267,233 B2
(45) Date of Patent: Sep. 18, 2012

(54) HYDRAULIC SYSTEM FOR CONTROLLING A DOUBLE-CLUTCH TRANSMISSION

(75) Inventor: Marco Grethel, Bühlertal (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 515 days.

(21) Appl. No.: 12/075,115

(22) Filed: Mar. 7, 2008

(65) Prior Publication Data

US 2008/0223683 A1 Sep. 18, 2008

Related U.S. Application Data

(60) Provisional application No. 60/905,338, filed on Mar. 7, 2007, provisional application No. 60/936,537, filed on Jun. 21, 2007.

(51) Int. Cl.
  *F16D 25/12* (2006.01)
  *F16D 13/74* (2006.01)
  *F16H 57/04* (2010.01)
(52) U.S. Cl. .............. 192/48.611; 192/85.61; 192/113.3
(58) Field of Classification Search ................ 192/87.13, 192/87.18, 85.61
  See application file for complete search history.

(56) References Cited

U.S. PATENT DOCUMENTS

| | | | | |
|---|---|---|---|---|
| 2,461,218 A * | 2/1949 | Lapsley | ...................... | 74/732.1 |
| 3,872,957 A * | 3/1975 | Maurer et al. | ........... | 192/113.34 |
| 4,093,051 A * | 6/1978 | Kreitzberg | ................. | 192/87.13 |
| 6,428,445 B1 | 8/2002 | Friedmann et al. | ............. | 477/44 |
| 6,827,191 B2 * | 12/2004 | Kuhstrebe | ................... | 192/48.92 |
| 2003/0047410 A1* | 3/2003 | Busold et al. | .............. | 192/87.11 |
| 2005/0288149 A1* | 12/2005 | Kuhstrebe et al. | .............. | 477/97 |

FOREIGN PATENT DOCUMENTS

| | | |
|---|---|---|
| DE | 1 276 461 | 8/1968 |
| DE | 100 42 749 A1 | 4/2001 |
| DE | 10 2005 013 137 A1 | 9/2006 |
| DE | 10 0225 015 911 A1 | 10/2006 |
| EP | 0 980 995 A2 | 2/2000 |
| EP | 0 980 995 A3 | 1/2001 |
| WO | WO 2006/099947 A1 | 9/2006 |

\* cited by examiner

*Primary Examiner* — Rodney Bonck
(74) *Attorney, Agent, or Firm* — Alfred J. Mangels

(57) ABSTRACT

A hydraulic system for controlling a double-clutch transmission operating with wet clutches. A pump provides a system pressure in a supply line, and a control valve for applying to individual clutch actuators an actuation pressure that is derived from the system pressure and that is modulated in accordance with the operating conditions. A charging valve directs hydraulic fluid delivered by the pump into a return line when the system pressure is reached, wherein the hydraulic fluid flowing through the return line can be fed to the clutches to cool them.

6 Claims, 4 Drawing Sheets

HYDRAULIC SYSTEM FOR CONTROLLING A DOUBLE-CLUTCH TRANSMISSION

BACKGROUND OF THE INVENTION

1. Field of the Invention

The present invention relates to a hydraulic system for controlling a double-clutch transmission that includes wet clutches.

2. Description of the Related Art

Such hydraulic systems include a pump to provide a system pressure in a supply line, and a control valve to individually apply to clutch actuators appropriate operating pressure that is derived from the system pressure and that is modulated in accordance with the operating conditions. A system valve directs hydraulic fluid delivered by the pump into a return line when the system pressure is reached.

A hydraulic system of the type described above is usable not only for wet clutches, but also for dry clutches, where it has proven itself well.

An object of the present invention is to further develop such a hydraulic system in such a way as to include a cooling arrangement for providing cooling hydraulic fluid to the clutches as needed, and to provide the cooling necessary for wet clutches to be accomplished in a simple manner.

SUMMARY OF THE INVENTION

Accordingly, the present invention involves using hydraulic fluid that is delivered by the pump to supply pressure to the hydraulic system to cool the clutches by circulating the hydraulic fluid when the system pressure is reached, so that it flows back through a return line without pressure to cool the clutches.

The invention relates to a hydraulic system for controlling a double-clutch transmission operating with wet clutches, which system includes a pump to provide a system pressure in a supply line. A control valve is provided to individually apply to clutch actuators actuating pressure derived from the system pressure and modulated in accordance with the circumstances, and a system valve which directs hydraulic fluid delivered by the pump into a return line when the system pressure is reached.

Advantageously, the hydraulic system in accordance with the invention includes a cooling control valve to control the quantity of hydraulic fluid that is supplied to the clutches.

The pump is driven for example by an internal combustion engine contained in a vehicle power train that includes the double-clutch transmission.

In a preferred embodiment, the hydraulic system in accordance with the invention additionally includes an auxiliary pump to transport cooling fluid to the clutches as needed. The auxiliary pump is advantageously electrically driven.

Furthermore, the auxiliary pump is advantageously configured in such a way, and is integrated into the hydraulic system in such a way, that a supply pressure can be produced in the supply line by means of the auxiliary pump.

The supply line of the hydraulic system is advantageously connected to a pressure accumulator, which ensures a system pressure when it is in the charged state.

BRIEF DESCRIPTION OF THE DRAWINGS

The structure, operation, and advantages of the present invention will become further apparent upon consideration of the following description taken in conjunction with the accompanying drawings, in which.

DESCRIPTION OF THE PREFERRED EMBODIMENTS

Figure 1:
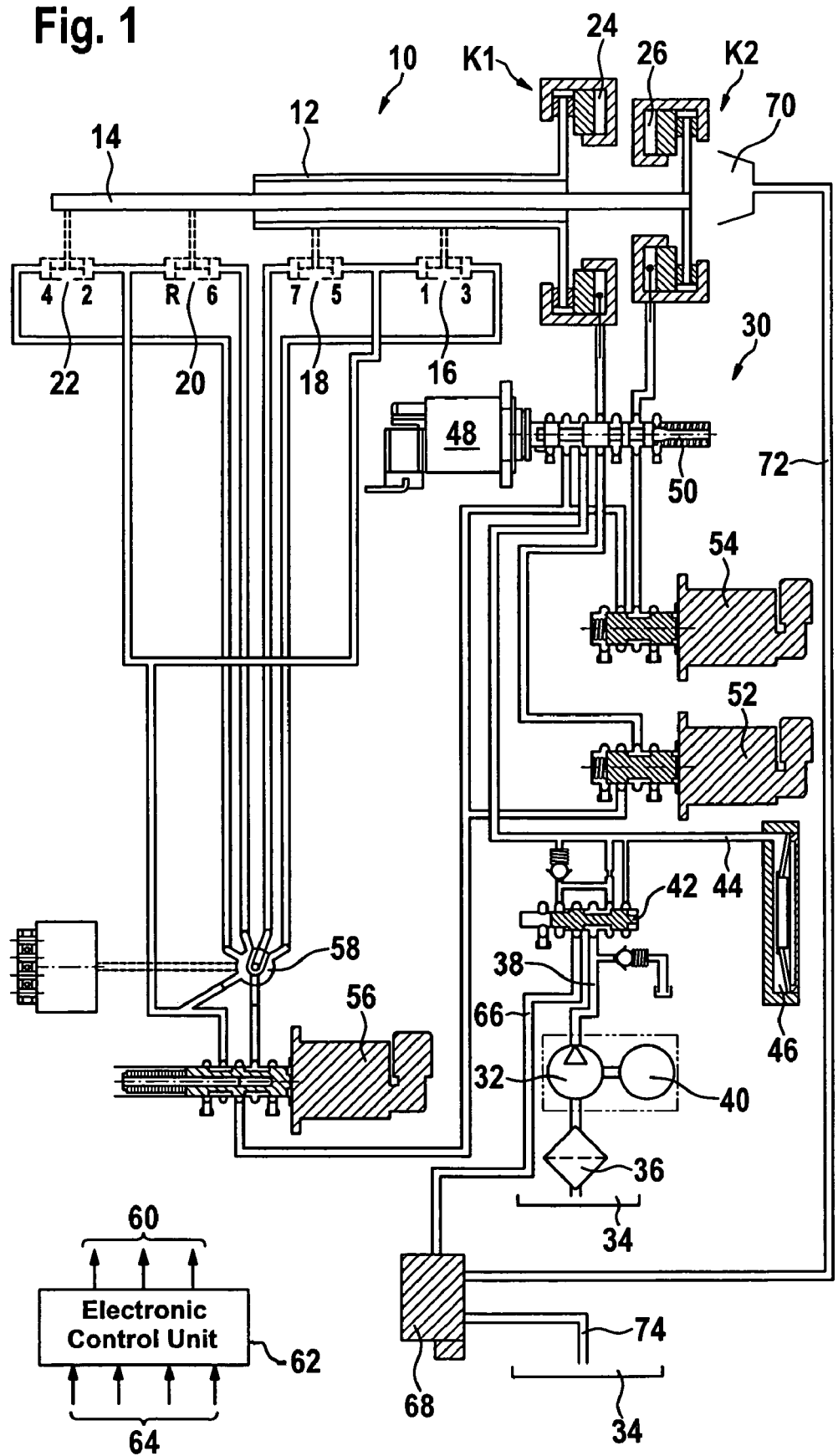
FIGS. 1 through 4 show hydraulic circuit diagrams of several embodiments of a hydraulic system in accordance with the invention.

As shown in the hydraulic circuit of FIG. 1, a double-clutch transmission that is designated in the aggregate as 10 includes two clutches K1 and K2, by means of which a drive shaft (not shown) driven by an internal combustion engine 40 can be rotatably coupled with input shafts 12 and 14. Input shaft 12 is hollow, and input shaft 14 extends within input shaft 12. Input shafts 12 and 14 are connected through shiftable gear sets to a common output shaft (not shown) of the double-clutch transmission, in a rotationally fixed connection. In the illustrated embodiment, input shaft 12 is operatively associated with a part of the transmission in which gears 1, 3, 5, and 7 are selectable. Input shaft 14 is operatively associated with a part of the transmission in which gears 2, 4, 6, and R are selectable. Transmission actuators for engaging the gears are designated as 16, 18, 20, and 22. Clutch actuators with which clutch K1 or clutch K2 can be operated are designated as 24 and 26, respectively.

To operate the hydraulically operated actuators, a hydraulic system identified in the aggregate as 30 is provided. Hydraulic system 30 includes a pump 32 to supply hydraulic fluid under pressure. Pump 32 delivers hydraulic fluid from a hydraulic fluid supply 34 through a filter 36 into a supply line 38. Pump 32 is driven by an internal combustion engine 40, which also furnishes torque that is transmitted by the double-clutch transmission 10. Supply line 38 is connected through an accumulator charging valve 42 to a supply line 44, in which a system pressure that is necessary for the hydraulic system to be able to function prevails. Connected to supply line 44 is a pressure accumulator 46, which is set to a predetermined system pressure and stores a certain volume of hydraulic fluid when that system pressure is reached, so that that system pressure is available even if a certain quantity of hydraulic fluid escapes from the supply line 44. Supply line 44 is connected through a valve 50 that is operated by a solenoid 48, to a control valve 52 that controls the clutch actuator 24 of clutch K1, to a control valve 54 that controls the clutch actuator 26 of clutch K2, and to a control valve 56 that controls the transmission actuators 16, 18, 20, and 22 through an intermediate changeover valve 58.

Control valves 52, 54, and 56 each include proportional magnets, to which current is applied from outputs 60 of an electronic control unit 62, to which signals that are relevant for the operation of the double-clutch transmission are supplied at inputs 64.

The construction and function of the arrangement described above are known, and therefore will not be described further.

In a known manner, the function of accumulator charging valve 42 includes switching over when the system pressure is reached in supply line 44 or when pressure accumulator 46 is full, so that the hydraulic fluid delivered by pump 32 then flows into a non-pressurized return line 66 and from there back to the hydraulic fluid supply 34.

In accordance with the present invention, return line 66 leads to a cooling control valve 68, which has as output lines a cooling line 72 that leads to clutch cooling device 70 and a recirculation line 74 that leads into hydraulic fluid supply 34.

The function of the described arrangement is as follows: when pressure accumulator 46 is full, that is, when full system pressure is present in supply line 44, accumulator charging valve 42 switches over, so that the hydraulic fluid delivered by pump 32 is delivered into return line 66. Cooling control valve 68 is connected to an output of electronic control unit 62 that supplies a signal relating .to the cooling need of clutches K1 and K2, which is derived from the operating conditions of the clutches (slippage, torque), for example. Alternatively, cooling control valve 68 is connected to one or more temperature sensors that determine the temperatures of the clutches, whereby exceeding predetermined temperatures indicates a need for cooling. When cooling is needed, cooling control valve 68 connects the return line 66 with the cooling line 72, so that the clutches can be cooled by means of a known clutch cooling device 70, which includes in particular a flow of hydraulic fluid through the wet clutches, thereby cooling them. When there is no need for cooling, cooling control valve 68 connects the return line 66 to the recirculation line 74. The cooling control valve 68 can be so designed that when there is a need for cooling it connects the cooling line 72 completely with the return line 66 and disconnects the recirculation line 74, or it delivers only the specifically needed flow of hydraulic fluid to the cooling line 72.

In a simplified embodiment, the cooling control valve 68 can be omitted, so that cooling fluid that is recirculated at full system pressure is used constantly to cool the clutches.

A characteristic feature of the described system is that in order to ensure adequate cooling of the clutches, pump 32 must be sized to be larger than is necessary to supply the actuators, namely large enough so that the maximum cooling need can be covered. Another characteristic feature is that at high rotational speeds of internal combustion engine 40, clearly too much hydraulic fluid is delivered. Thus, in order to keep the flow losses small, large line cross-sections are necessary.

Figure 2:
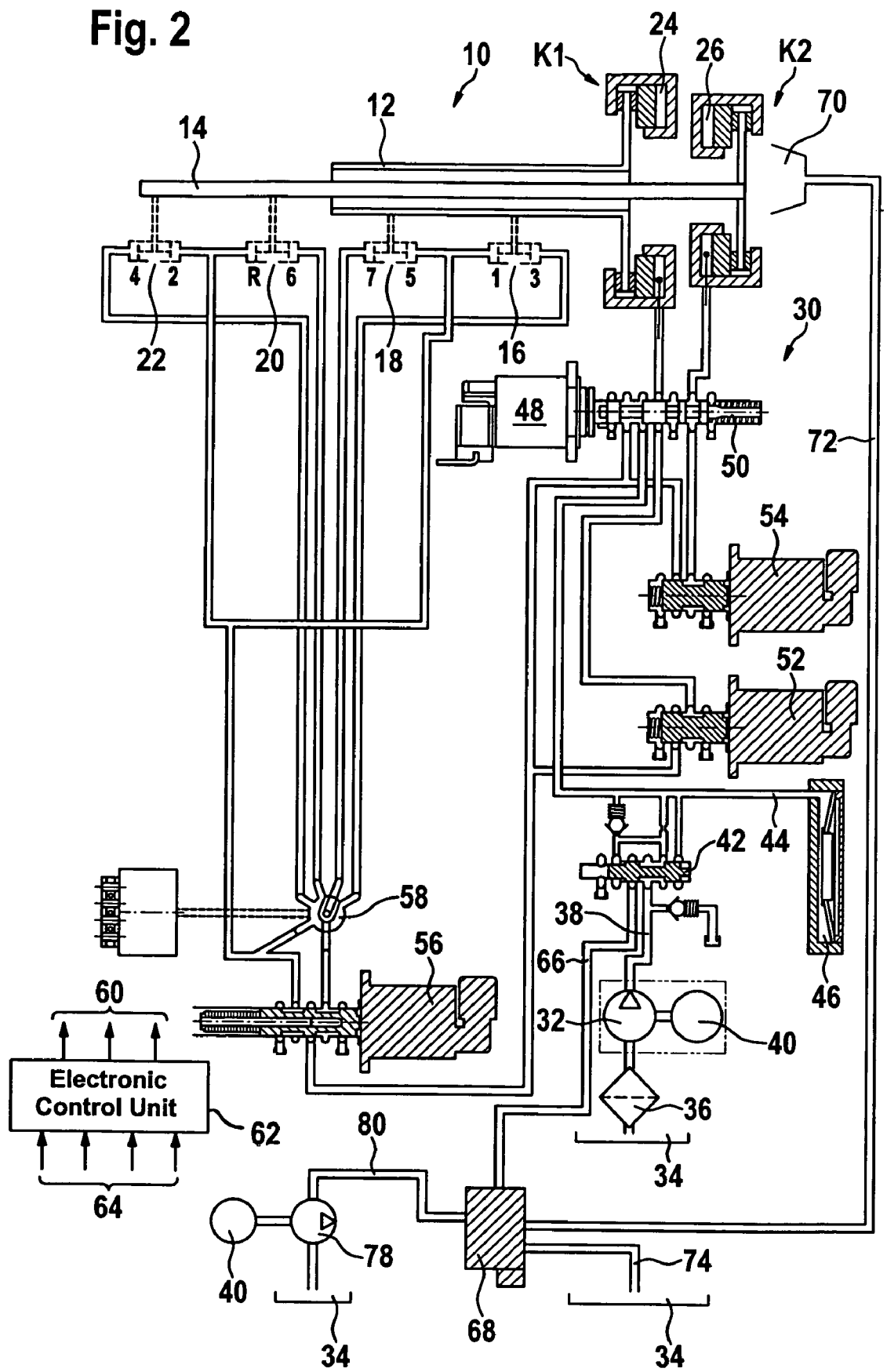

In order to avoid the above-identified characteristic features, the system can be modified as illustrated in FIG. 2. In accordance with FIG. 2, an auxiliary pump 78 is provided, which preferably also feeds hydraulic fluid from the hydraulic fluid supply 34, through a line 80 to cooling control valve 68. Auxiliary pump 78 is a tandem pump of pump 32, for example, and thus is likewise driven by internal combustion engine 40. If pump 32 is a vane pump, the auxiliary pump 78 can be designed as a second flow chamber of the vane pump. The auxiliary pump is adjusted to the quantity of cooling fluid necessary for maximum cooling of the clutches, or is advantageously adjusted to the cooling fluid throughput that is necessary in addition to the hydraulic fluid delivered through return line 66 by pump 32.

Auxiliary pump 78 can be suction-throttled if necessary, which is possible without acoustic problems because the auxiliary pump operates only within a small pressure range, for example a maximum of 3 bar. It goes without saying that cooling control valve 68 is designed in such a way that when there is a need for cooling it connects lines 66 and 80 to cooling line 72. Advantageously, a check valve (not shown) is situated in return line 66, which prevents cooling fluid delivered by auxiliary pump 78 from flowing in the direction of accumulator charging valve 42. Cooling control valve 68 can also be omitted in the embodiment shown in FIG. 2, in which case overcooling of the clutches is then tolerated if necessary.

Figure 3:
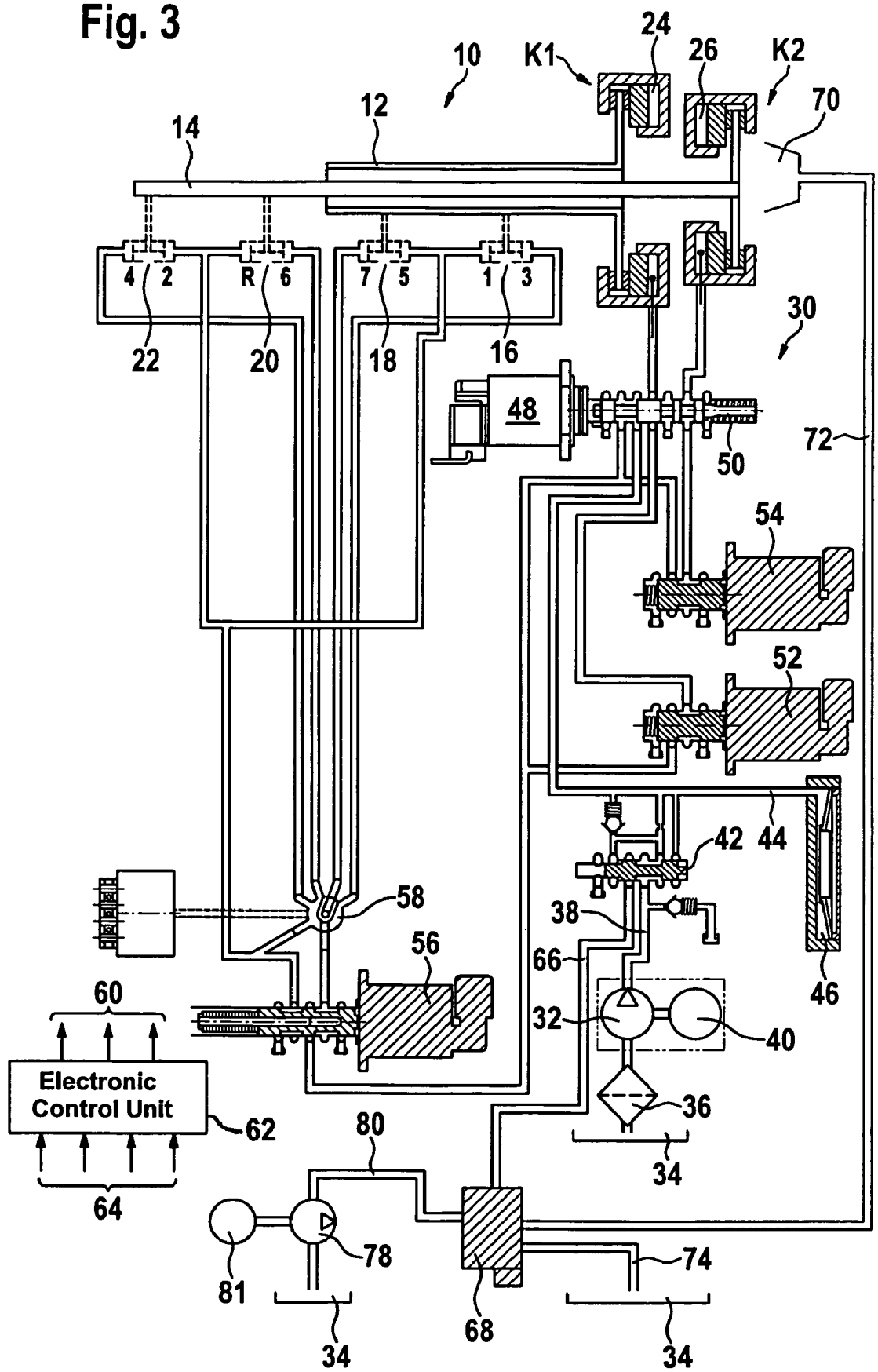

FIG. 3 shows an embodiment of the hydraulic system that is especially well adapted to the particular cooling need, and which operates with low energy consumption.

In the embodiment in accordance with FIG. 3, auxiliary pump 78 is driven by a separate electric motor 81, which is controlled by the electronic control unit 62, for example, or by one or more separate temperature sensors for determining the temperatures of the clutches. When the need for cooling is great the electric motor 81 is actuated, so that auxiliary pump 78 delivers additional hydraulic fluid only then, and advantageously in accordance with need. Line 80 in FIG. 3, like line 80 in FIG. 2, could be connected directly to cooling line 72, in which case a check valve (not shown) is then advantageously positioned in line 80 to prevent a flow of hydraulic fluid in the direction toward auxiliary pump 78.

Whereas in the embodiment shown in FIG. 1 there is no hydraulic fluid available for cooling for the brief time periods in which pressure accumulator 46 must be recharged, in the embodiments in accordance with FIGS. 2 and 3 hydraulic fluid is constantly available for cooling.

Figure 4:
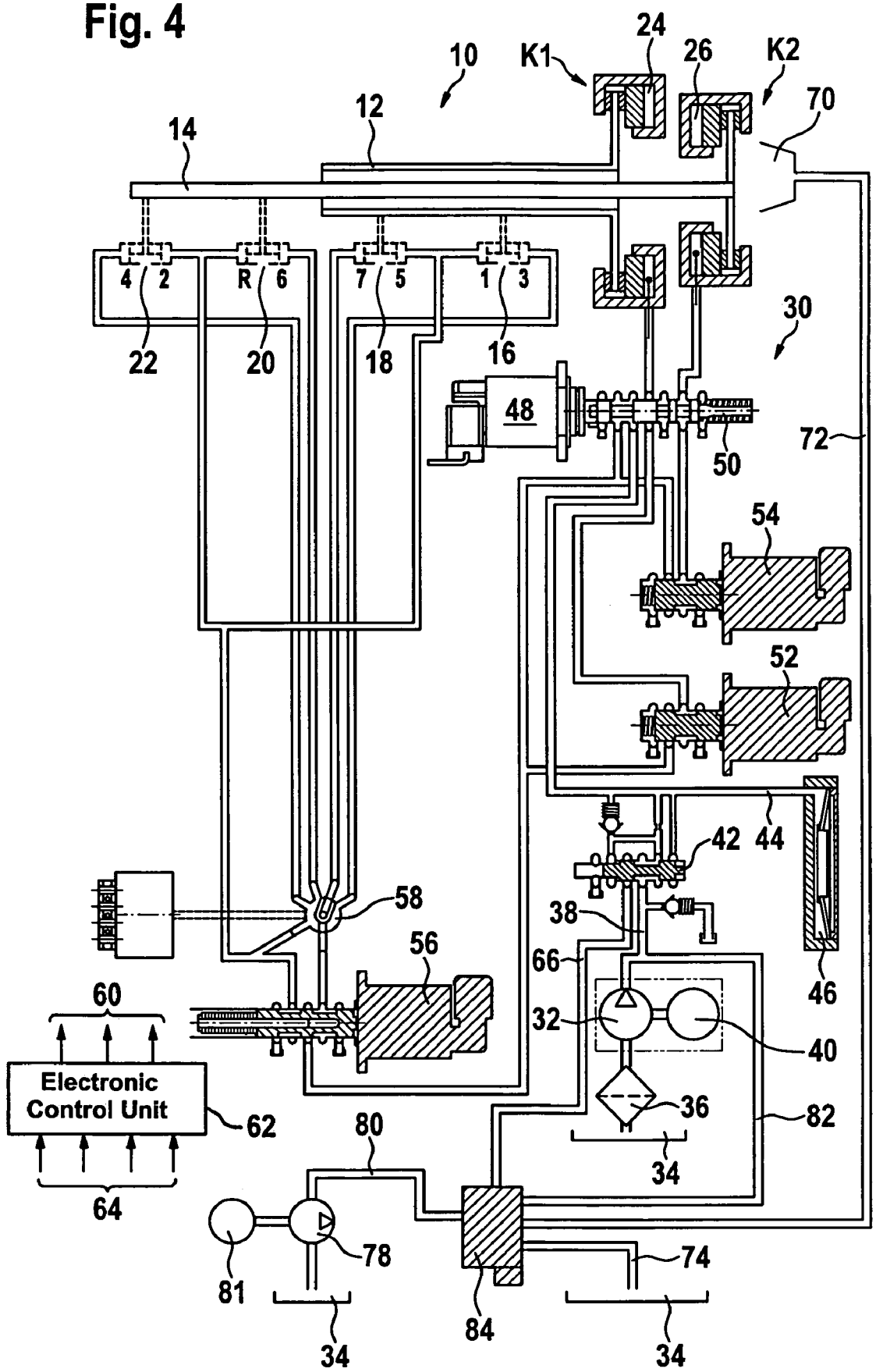

FIG. 4 shows an embodiment of the invention that is a modification of the arrangement shown in FIG. 3, in that hydraulic fluid is delivered by auxiliary pump 78 through an auxiliary feed line 82 directly into the supply line 38. In addition, the cooling control valve 68 of FIG. 3 is replaced by a valve 84 that is preferably likewise connected to electronic control unit 62. Electric motor 81 and auxiliary pump 78 are advantageously of somewhat higher capacity design than in the embodiment in accordance with FIG. 3, so that by means of auxiliary pump 78 double-clutch transmission 10 can be supplied by means of auxiliary pump 78 with the system pressure that is necessary for its functioning.

The embodiment in accordance with FIG. 4 is suitable for vehicles with stop-start systems, and for hybrid vehicles in which the internal combustion engine 40 is automatically shut down in certain operating phases, and is quickly switched on again in case of need. When internal combustion engine 40 is not running and the system pressure in supply line 44 is dropping, electric motor 81 is actuated and line 80 is connected through valve 84 to auxiliary feed line 82, which leads into supply line 38. Advantageously, a check valve (not shown) is situated between the junction of auxiliary feed line 82 with supply line 38 and pump 32, which prevents a flow of fluid from auxiliary feed line 82 through pump 32. Thus, the functional capability of double-clutch transmission 10 continues to be ensured in phases during which internal combustion engine 40 is not running. When the system pressure is present, electric motor 81 is advantageously shut off. However, it can continue to run if cooling is needed for the clutches, so that there is standby hydraulic fluid for cooling the clutches, which is delivered by pump 32 through lines 82, 38, valve 42, and line 66 to cooling line 72, or directly from line 80 into cooling line 72. In other respects the functioning of the hydraulic system in accordance with FIG. 4 corresponds to that shown in FIG. 3.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A hydraulic system for controlling a double-clutch transmission operating with wet clutches, said hydraulic system comprising: a primary pump for providing from a hydraulic fluid supply a system pressure in a supply line connected with a charging valve; a control valve connected with the charging valve for applying to individual clutch actuators an actuating pressure derived from the system pressure and modulated in accordance with operating conditions; wherein the charging valve includes an outlet connected with an unpressurized return line for directing hydraulic fluid delivered by the primary pump into the return line when the system pressure is reached; and a cooling control valve operatively connected with the charging valve by the return line for controlling a quantity of hydraulic fluid for cooling the clutches, wherein the cooling control valve includes an inlet connected with the return line and includes at an output a line that connects with a clutch cooling device and a recirculation line that leads to the hydraulic fluid supply, wherein hydraulic fluid flowing from the charging valve through the return line passes through the cooling control valve and is selectively delivered by the cooling control valve to the clutches to cool them or to the hydraulic fluid supply.

2. A hydraulic system in accordance with claim 1, wherein the primary pump is driven by an internal combustion engine contained in a vehicle power train that includes the double-clutch transmission.

3. A hydraulic system in accordance with claim 1, including an auxiliary pump operatively connected with the cooling control valve for delivering cooling fluid to the clutches as needed.

4. A hydraulic system in accordance with claim 3, wherein the auxiliary pump is driven electrically.

5. A hydraulic system in accordance with claim 3, wherein the auxiliary pump is of such a capacity, and is integrated into the hydraulic system in such a way, that a pressure corresponding with the system pressure can be produced in the supply line by the auxiliary pump.

6. A hydraulic system in accordance with claim 1, wherein the supply line is connected to a pressure accumulator.

* * * * *